(12) United States Patent
Kim et al.

(10) Patent No.: US 9,746,708 B2
(45) Date of Patent: Aug. 29, 2017

(54) LIQUID CRYSTAL DISPLAY PANEL AND LIQUID CRYSTAL DISPLAY DEVICE HAVING THE SAME

(71) Applicant: Samsung Display Co., LTD., Yongin, Gyeonggi-Do (KR)

(72) Inventors: Kyeong-Ha Kim, Hwaseong-si (KR); Sang-Jae Kim, Seongnam-si (KR); Hyoung-Joo Lee, Seoul (KR); Teck-Soo Kim, Seongnam-si (KR); Min-Oh Choi, Cheonan-si (KR); Seung-Beom Park, Hwaseong-si (KR)

(73) Assignee: Samsung Display Co., Ltd. (KR)

(*) Notice: Subject to any disclaimer, the term of this patent is extended or adjusted under 35 U.S.C. 154(b) by 0 days.

(21) Appl. No.: 14/323,767

(22) Filed: Jul. 3, 2014

(65) Prior Publication Data

US 2015/0234229 A1   Aug. 20, 2015

(30) Foreign Application Priority Data

Feb. 20, 2014  (KR) .................. 10-2014-0019404

(51) Int. Cl.
    *G02F 1/1335*  (2006.01)
    *C09K 19/52*   (2006.01)
    *C09K 19/02*   (2006.01)

(52) U.S. Cl.
    CPC ........ *G02F 1/133528* (2013.01); *C09K 19/02* (2013.01); *C09K 19/52* (2013.01); *C09K 2019/525* (2013.01); *G02F 2001/133548* (2013.01)

(58) Field of Classification Search
    CPC ......... G02F 1/133528; G02F 1/133536; G02F 2001/133548; G02B 5/3058; G02B 5/3025; G02B 5/3033; C09K 19/52; C09K 19/02; C09K 2019/525
    USPC .......................... 349/96; 359/485.05, 487.03
    See application file for complete search history.

(56) References Cited

U.S. PATENT DOCUMENTS

| 2013/0141774 A1* | 6/2013 | McCarthy ............ 359/288 |
| 2013/0222732 A1  | 8/2013 | O'Neill et al. |
| 2014/0098330 A1* | 4/2014 | Nam et al. ............ 349/96 |

FOREIGN PATENT DOCUMENTS

| JP | 2011-048310    | 3/2011 |
| JP | 2011-081334    | 4/2011 |
| JP | 2013-041052    | 2/2013 |
| KR | 10-2008-0057063 | 6/2008 |
| KR | 10-2012-0022617 | 3/2012 |
| KR | 10-2012-0040412 | 4/2012 |
| KR | 10-2012-0040871 | 4/2012 |
| KR | 10-2012-0107256 | 10/2012 |
| KR | 10-2012-0126951 | 11/2012 |
| KR | 10-2012-0140408 | 12/2012 |
| KR | 10-2013-0003197 | 1/2013 |
| KR | 10-2013-0023087 | 3/2013 |

(Continued)

*Primary Examiner* — Nathanael R Briggs
*Assistant Examiner* — William Peterson
(74) *Attorney, Agent, or Firm* — Innovation Counsel LLP

(57) ABSTRACT

A liquid crystal display panel includes a first base substrate, a wire grid polarizer disposed on the first base substrate, a lyotropic chromonic liquid crystal polarizer disposed on the first base substrate, a second base substrate facing the first base substrate and a liquid crystal layer between the first base substrate and the second base substrate.

16 Claims, 7 Drawing Sheets

(56) References Cited

FOREIGN PATENT DOCUMENTS

| KR | 10-2013-0024041 | 3/2013 |
| KR | 10-2013-0037126 | 4/2013 |

\* cited by examiner

LIQUID CRYSTAL DISPLAY PANEL AND LIQUID CRYSTAL DISPLAY DEVICE HAVING THE SAME

CROSS-REFERENCE TO RELATED APPLICATION

This application claims priority to Korean Patent Application No. 10-2014-0019404, filed on Feb. 20, 2014, and all the benefits accruing therefrom under 35 U.S.C. §119, the contents of which in its entirety is herein incorporated by reference.

BACKGROUND

1. Field

Exemplary embodiments of the inventive concept relate to a liquid crystal display panel and a liquid crystal display device having the liquid crystal display panel. More particularly, exemplary embodiments of the inventive concept relate to a liquid crystal display panel and a liquid crystal display device having the liquid crystal display panel capable of improving polarizing efficiency.

2. Description of the Related Art

A liquid crystal display device may include an array substrate, an opposing substrate and a liquid crystal layer interposed therebetween. The liquid crystal display device may display an image by adjusting an amount of light through the substrates according to an arrangement of liquid crystals in the liquid crystal layer. The liquid crystal display device may further include a backlight unit having a light source to generate the light. The light may be provided with a liquid crystal display panel including the array substrate, the opposing substrate and the liquid crystal layer.

A polarizing element disposed on or under the liquid crystal display panel may polarize the light. The polarizing element may include, e.g., a polyvinyl alcohol ("PVA") film. The polarizing element having a high polarization ratio and transmissivity is required.

Research and development have been conducted to use a nano-wire polarizing element to improve the polarization ratio and the transmissivity. However, a polarization ratio of the nano-wire polarizing element is about 99.8%, which does not satisfy a demand for a high-luminance display device to have a polarization ratio of about 99.99% or more.

SUMMARY

One or more exemplary embodiment of the inventive concept provides a liquid crystal display panel capable of improving a polarization ratio.

Also, an exemplary embodiment of the inventive concept provides a liquid crystal display device including the liquid crystal display panel.

In an exemplary embodiment of a liquid crystal display panel according to the inventive concept, the liquid crystal display panel includes a first base substrate, a wire grid polarizer disposed on the first base substrate, a lyotropic chromonic liquid crystal polarizer disposed on the first base substrate, a second base substrate facing the first base substrate and a liquid crystal layer interposed therebetween.

In an exemplary embodiment, the wire grid polarizer and the lyotropic chromonic liquid crystal polarizer may be disposed on the first base substrate.

In an exemplary embodiment, the wire grid polarizer and the lyotropic chromonic liquid crystal polarizer may have a same transmission axis.

In an exemplary embodiment, the lyotropic chromonic liquid crystal polarizer may be disposed on a first surface of the first base substrate. The wire grid polarizer may be disposed on a second surface of the first base substrate opposite to the first surface of the first base substrate.

In an exemplary embodiment, the lyotropic chromonic liquid crystal polarizer and the wire grid polarizer may be disposed on a same surface of the first base substrate.

In an exemplary embodiment, the wire grid polarizer may be disposed between the lyotropic chromonic liquid crystal polarizer and the first base substrate.

In an exemplary embodiment, the lyotropic chromonic liquid crystal polarizer may be disposed between the wire grid polarizer and the first base substrate.

In an exemplary embodiment, the liquid crystal display panel may further include a protection layer disposed between the wire grid polarizer and the lyotropic chromonic liquid crystal polarizer.

In an exemplary embodiment, the liquid crystal display panel may further include an absorptive polarizer disposed on the second base substrate.

In an exemplary embodiment, the wire grid polarizer may be disposed on the first base substrate and the lyotropic chromonic liquid crystal polarizer may be disposed on the second base substrate.

In an exemplary embodiment, the wire grid polarizer and the lyotropic chromonic liquid crystal polarizer may have transmission axes substantially perpendicular to each other.

In an exemplary embodiment, the lyotropic chromonic liquid crystal polarizer may be disposed between the liquid crystal layer and the second base substrate.

In an exemplary embodiment, the liquid crystal display panel may further include an absorptive polarizer disposed on one of the second base substrate. The lyotropic chromonic liquid crystal polarizer may be disposed between the second base substrate and the absorptive polarizer.

In an exemplary embodiment of a liquid crystal display panel according to the inventive concept, the liquid crystal display panel includes an array substrate including a wire grid polarizer and a thin film transistor disposed on the wire grid polarizer, an opposing substrate facing the array substrate and a liquid crystal layer interposed therebetween. The opposing substrate includes a base substrate and a lyotropic chromonic liquid crystal polarizer on the base substrate.

In an exemplary embodiment, the lyotropic chromonic liquid crystal polarizer may be disposed on a first side of the base substrate, the first side facing the liquid crystal layer.

In an exemplary embodiment, the opposing substrate may further include an absorptive polarizer disposed on a second side of the base substrate, the second side being opposite to the first side.

In an exemplary embodiment, the opposing substrate may further include an absorptive polarizer disposed on a first side of the base substrate. The lyotropic chromonic liquid crystal polarizer may be disposed between the base substrate and the absorptive polarizer.

In an exemplary embodiment, the liquid crystal pane may further include a protection layer disposed between the lyotropic chromonic liquid crystal polarizer and the absorptive polarizer.

In an exemplary embodiment of a liquid crystal display device according to the inventive concept, the liquid crystal display device includes an array substrate, an opposing substrate facing the array substrate, a liquid crystal layer interposed therebetween and a light source part configured to emit light toward the array substrate. The array substrate includes a base substrate, a plurality of polarizers disposed on the base substrate, a thin film transistor disposed on the polarizers and a pixel electrode electrically connected to the thin film transistor. The polarizers includes a wire grid polarizer including a plurality of linear metal patterns extending in a direction and a lyotropic chromonic liquid crystal polarizer including an aggregation of a plurality of lyotropic chromonic liquid crystals.

In an exemplary embodiment, the wire grid polarizer may be disposed between the lyotropic chromonic liquid crystal polarizer and the base substrate.

According to one or more exemplary embodiment of the liquid crystal display panel and a liquid crystal display device having the liquid crystal display panel, the liquid crystal display panel may include a wire grid polarizer and a lyotropic chromonic liquid crystal polarizer, thereby improving a polarization ratio of the liquid crystal display panel.

BRIEF DESCRIPTION OF THE DRAWINGS

The above and other features and advantages of the inventive concept will become more apparent by describing in detailed exemplary embodiments thereof with reference to the accompanying drawings, in which.

DETAILED DESCRIPTION

Hereinafter, exemplary embodiments of the inventive concept will be described in further detail with reference to the accompanying drawings.

Figure 1:
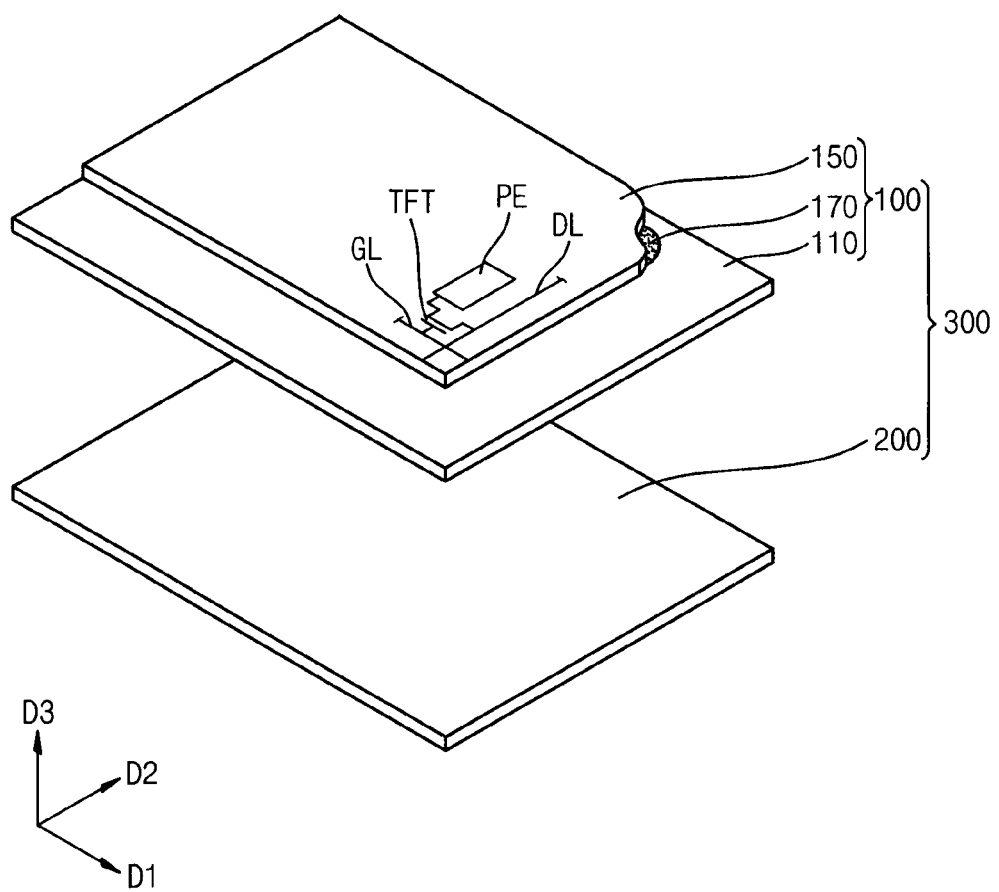
FIG. 1 is an exploded perspective view illustrating a liquid crystal display device according to an exemplary embodiment of the inventive concept.
Figure 2:
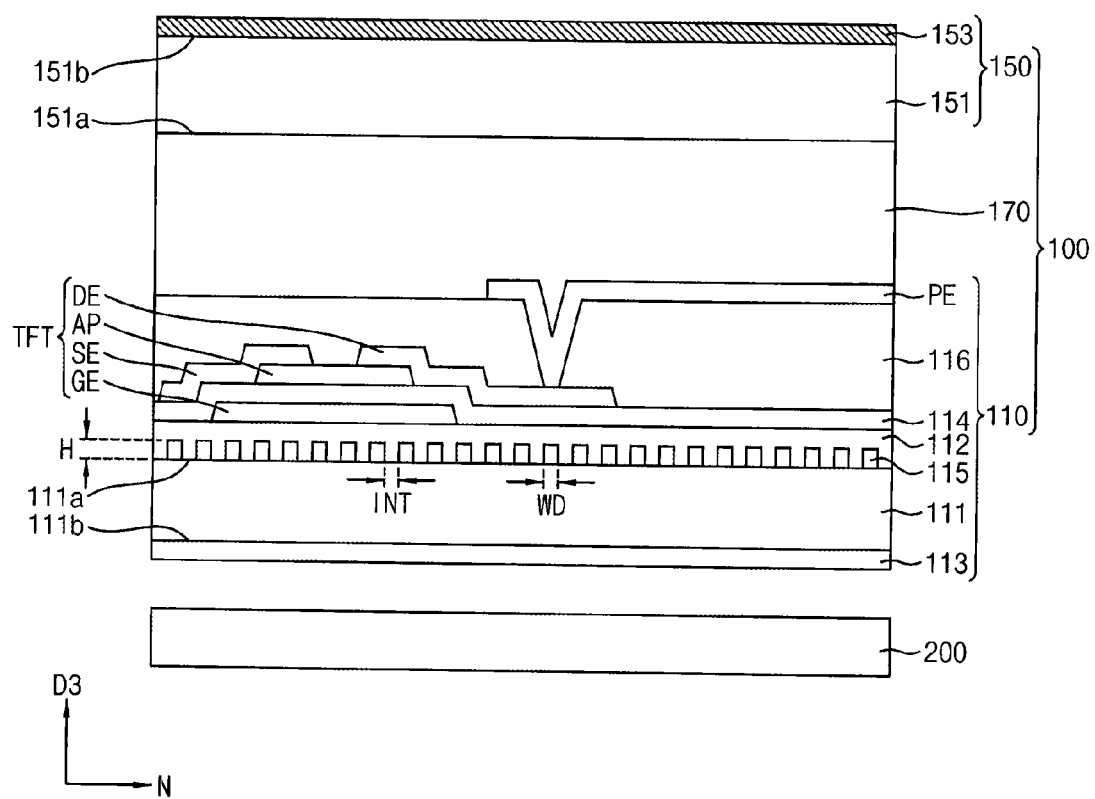
FIG. 2 is a cross-sectional view illustrating the liquid crystal display device in FIG. 1.

FIG. 1 is an exploded perspective view illustrating a liquid crystal display device according to an exemplary embodiment of the inventive concept. FIG. 2 is a cross-sectional view illustrating the liquid crystal display device in FIG. 1.

Referring to FIG. 1 and FIG. 2, a liquid crystal display device 300 according to the present exemplary embodiment may include a liquid crystal display panel 100 and a light source part 200. The liquid crystal display panel 100 may include an array substrate 110, an opposing substrate 150 and a liquid crystal layer 170.

The array substrate 110 may include a thin film transistor TFT and a pixel electrode PE. The pixel electrode PE may be electrically connected to the thin film transistor TFT. The opposing substrate 150 may face the array substrate 110. The liquid crystal layer 170 may be disposed between the array substrate 110 and the opposing substrate 150.

The array substrate 110 may further include a first base substrate 111, a lyotropic chromonic liquid crystal polarizer 113, a wire grid polarizer 115, a passivation layer 112, a gate line GL, a gate insulation layer 114, a data line DL and an organic insulation layer 116. The thin film transistor TFT may include a gate electrode GE, an active pattern AP, a source electrode SE and a drain electrode DE.

The first base substrate 111 may include a first surface 111a and second surface 111b facing the first surface 111a. The first base substrate 111 may include a transparent insulation material. For example, the first base substrate 111 may include glass, quartz, and plastic such as a polyethylene terephthalate resin, a polyethylene resin, a polycarbonate resin, or the like. Hereinafter, if a plurality of elements is disposed on the first surface 111a, the elements may be sequentially disposed on an upper surface of the first base substrate 111. Likewise, if a plurality of elements is disposed on the second surface 111b, the elements may be sequentially disposed on a lower surface of the first base substrate 111.

The lyotropic chromonic liquid crystal polarizer 113 may be disposed on the second surface 111b of the first base substrate 111. The lyotropic chromonic liquid crystal polarizer 113 may include lyotropic chromonic liquid crystals. A phase transition of the lyotropic chromonic liquid crystals may occur according to a concentration of the lyotropic chromonic liquid crystals. The lyotropic chromonic liquid crystals may be described in detail referring to FIG. 3.

The wire grid polarizer 115 may be disposed on the first surface 111a of the first base substrate 111. The wire grid polarizer 115 may include a plurality of linear metal patterns. The linear metal patterns may be spaced apart from one another by a gap INT. The linear metal patterns may have a width WD and a thickness H. The width WD and the thickness H may be in a range between tens of nanometers and hundreds of nanometers. For example, the thickness H of the linear metal patterns may be substantially about three times greater than the width WD of the linear metal patterns. The wire grid polarizer 115 may extend in a direction. An incident light substantially perpendicular to the direction in which the wire grid polarizer 115 extends may be transmitted through the wire grid polarizer 115. An incident light substantially parallel with the direction in which the wire grid polarizer 115 extends may be reflected by the wire grid polarizer 115. If the width WD and the gap INT of the linear metal patterns are less than a wavelength of the incident light, a polarization ratio of the incident light may be improved. For example, if the incident light has a wavelength between about 400 nanometers and about 700 nanometers, the width WD and the gap INT of the linear metal patterns may be equal to or less than about 400 nanometers. For example, the width WD, the gap INT and the thickness H of the linear metal patterns may be about 50 nanometers, about 50 nanometers and about 150 nanometers, respectively. The wire grid polarizer 115 may include a metal having a relatively high reflectance. For example, the wire grid polarizer 115 may include aluminum (Al), gold (Au), silver (Ag), copper (Cu), chromium (Cr), iron (Fe), nickel (Ni), or the like.

The passivation layer 112 may be disposed on the first base substrate 111 on which the wire grid polarizer 115 is disposed. The passivation layer 112 may entirely cover the wire grid polarizer 115. The passivation layer 112 may include a transparent insulation material. For example, the passivation layer 112 may include silicon oxide, silicon nitride, or the like.

The gate line GL may be disposed on the first base substrate 111 on which the passivation layer 112 is disposed. The gate line GL may extend in a first direction D1. The gate line GL may include, e.g., aluminum (Al), gold (Au), silver (Ag), copper (Cu), chromium (Cr), iron (Fe), nickel (Ni), or the like. For example, the gate line GL may include indium doped zinc oxide ("IZO"), gallium doped zinc oxide ("GZO"), or the like.

The gate electrode GE may be electrically connected to the gate line GL. The gate electrode GE may include a same material as the gate line GL. For example, the gate electrode GE may be integrally formed with the gate line GL.

The gate insulation layer 114 may be disposed on the first base substrate 111 on which the gate line GL and the gate electrode GE are disposed. The gate insulation layer 114 may include a transparent insulation material such as, e.g., silicon oxide, silicon nitride, or the like.

The active pattern AP may be disposed on the gate insulation layer 114. The active pattern AP may overlap the gate electrode GE. For example, the active pattern AP may include amorphous silicon, poly silicon or an oxide semiconductor material such as, e.g., indium gallium zinc oxide ("IGZO"), indium tin zinc oxide ("ITZO"), hafnium indium zinc oxide ("HIZO"), or the like.

The data line DL may be disposed on the first base substrate 111 on which the active pattern AP is disposed. The data line DL may extend in a second direction D2 crossing the first direction D1. The data line DL may include a same material as the gate line GL. For example, the data line DL may include aluminum (Al), gold (Au), silver (Ag), copper (Cu), chromium (Cr), iron (Fe), nickel (Ni), or the like.

The source electrode SE may be disposed on the gate insulation layer 114. The source electrode SE may overlap a first end portion of the active pattern AP. The source electrode SE may be electrically connected to the data line DL. For example, the source electrode SE may be integrally formed with the data line DL.

The drain electrode DE may be disposed on the gate insulation layer 114. The drain electrode DE may overlap a second end portion of the active pattern AP. The drain electrode DE may be spaced apart from the source electrode SE. The drain electrode DE may include a same material as the source electrode SE. For example, the source electrode SE and the drain electrode DE may include aluminum (Al), gold (Au), silver (Ag), copper (Cu), chromium (Cr), iron (Fe), nickel (Ni), or the like.

The organic insulation layer 116 may be disposed on the source electrode SE and the drain electrode DE. The organic insulation layer 116 may cover the source electrode SE and the drain electrode DE. The organic insulation layer 116 may have a substantially flat surface. The organic insulation layer 116 may include, e.g., an acryl resin, a phenol resin, etc. An inorganic insulation layer (not shown) may be formed on the source electrode SE and the drain electrode DE, and below the organic insulation layer 116.

The pixel electrode PE may be disposed on the organic insulation layer 116. The pixel electrode PE may contact the drain electrode DE through a contact hole defined in the organic insulation layer 116. The pixel electrode PE may include a transparent conductive material. A plurality of slits may be formed in the pixel electrode PE. The slits may extend in a direction.

Although the thin film transistor TFT has a bottom-gate structure in which the active pattern AP is disposed on the gate electrode GE in FIG. 2, a structure of the thin film transistor TFT according to exemplary embodiments of the inventive concept is not limited thereto. For example, the thin film transistor TFT may have a top-gate structure in which the gate electrode GE is disposed on the active pattern AP.

Although the pixel electrode PE is disposed on the organic insulation layer 116 in FIG. 2, the pixel electrode PE may be disposed on other elements instead of the organic insulation layer 116. For example, the pixel electrode PE may be disposed on an inorganic insulation layer instead of the organic insulation layer 116. A common electrode (not illustrated in FIG. 2) may be disposed on the array substrate 110 or the opposing substrate 150 and may be configured to form an electric field with the pixel electrode PE.

The opposing substrate 150 may include a second base substrate 151 and an upper polarizer 153. The upper polarizer 153 may be an absorptive polarizer. The upper polarizer 153 may have an absorptive axis perpendicular to that of the lyotropic chromonic liquid crystal polarizer 113 and the wire grid polarizer 115.

The second base substrate 151 may include a third surface 151a and a fourth surface 151b opposite to the third surface 151a. The second base substrate 151 may include a transparent insulation material. The second base substrate 151 may include a same material as the first base substrate 151. For example, the second base substrate 151 may include glass, quartz, and plastic such as a polyethylene terephthalate resin, a polyethylene resin, a polycarbonate resin, or the like.

The upper polarizer 153 may be disposed on the fourth surface 151b of the second base substrate 151. The upper polarizer 153 may include a triacetylcellulose ("TAC") layer, a polyvinyl alcohol ("PVA") layer, or the like.

The light source part 200 may be configured to emit light toward the liquid crystal display panel 100. The light may be emitted toward a third direction D3 perpendicular to the first direction D1 and the second direction D2. The light source part 200 may include a direct-illumination type, edge-illumination type, or the like. For example, if the light source part 200 is the direct-illumination type, the light source part 200 may include a light source under a display area of the liquid crystal display panel 100. For example, if the light source part 200 includes the edge-illumination type, the light source part 200 may include a light guiding plate under the display area and a light source adjacent to a side surface of the light guiding plate.

Figure 3:
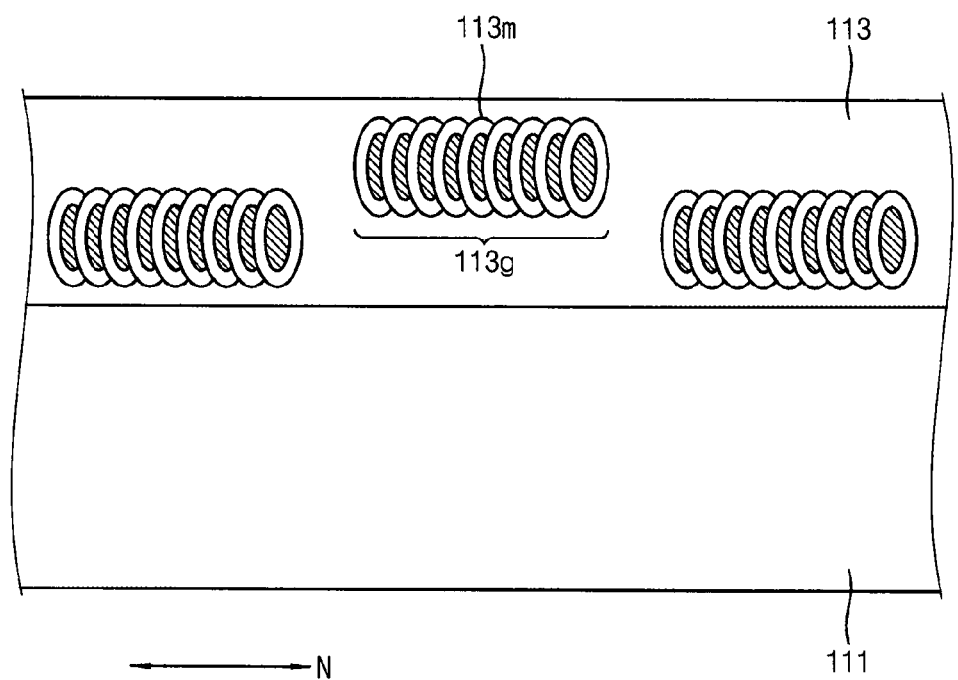
FIG. 3 is an enlarged cross-sectional view illustrating a lyotropic chromonic liquid crystal polarizer in FIG. 2.

FIG. 3 is an enlarged cross-sectional view illustrating a lyotropic chromonic liquid crystal polarizer in FIG. 2.

Referring to FIG. 2 and FIG. 3, the lyotropic chromonic liquid crystal polarizer 113 may include a plurality of lyotropic chromonic liquid crystals 113m. The lyotropic chromonic liquid crystals 113m may have a plank shape or a disc shape. The lyotropic chromonic liquid crystals 113m may be aromatic compounds. The lyotropic chromonic liquid crystals 113m may be stacked as a cylindrical shape by a π-π interaction to form aggregations 113g. The aggregations 113g of the lyotropic chromonic liquid crystals 113m may have an absorption waveband according to a color. The aggregations 113g of the lyotropic chromonic liquid crystals 113m may be arranged in a direction in a predetermined concentration range. For example, the aggregations 113g may be arranged in a fourth direction N perpendicular to the third direction D3. The fourth direction N may cross the first direction D1 or the second direction D2. Alternatively, the fourth direction N may be substantially parallel with the first direction D1 or the second direction D2. The lyotropic chromonic liquid crystal polarizer 113 may be configured to transmit light parallel with a direction in which the aggregations 113g are arranged. The lyotropic chromonic liquid crystal polarizer 113 may be configured to absorb light perpendicular to a direction in which the aggregations 113g are arranged. In the present exemplary embodiment, the fourth direction N may be substantially perpendicular to the direction in which the linear metal patterns of the wire grid polarizer 115 extend.

The lyotropic chromonic liquid crystal polarizer 113 may be coated on the first base substrate 111. For example, the lyotropic chromonic liquid crystal polarizer 113 may be coated on the first base substrate 111. Then, an ultraviolet light may be irradiated on the first base substrate 111 to form the lyotropic chromonic liquid crystal polarizer 113 as a thin film.

As mentioned above, the liquid crystal display device 300 according to the present exemplary embodiment may include the wire grid polarizer 115 and the lyotropic chromonic liquid crystal polarizer 113, thereby improving a polarization ratio of backlight from the light source part 200.

For example, if a transmissivity of light through a first pair of polarizers having substantially parallel transmission axes is denoted by Tp and if a transmissivity of light through a second polarizers having substantially perpendicular transmission axes is denoted by Tc, then a polarization ratio PE of the first and the second pairs of the polarizers may be represented by Equation 1.

$$PE = \frac{T_p - T_c}{T_p + T_c} \quad \text{[Equation 1]}$$

If light from the light source part 200 passes through the lyotropic chromonic liquid crystal polarizer 113 and the wire grid polarizer 115, then the polarization ratio PE may be improved as illustrated in Table 1 according to polarization ratios of the lyotropic chromonic liquid crystal polarizer 113 and the wire grid polarizer 115.

TABLE 1

| Polarization Ratio | Wire Grid Polarizer | | | |
|---|---|---|---|---|
| | 0.996 | 0.997 | 0.998 | 0.999 |
| Lyotropic Chromonic Liquid Crystal Polarizer 0.96 | 0.99992 | 0.99994 | 0.99996 | 0.99998 |
| 0.97 | 0.99994 | 0.99995 | 0.99997 | 0.99998 |
| 0.98 | 0.99996 | 0.99997 | 0.99998 | 0.99999 |
| 0.99 | 0.99998 | 0.99998 | 0.99999 | 0.99999 |

For example, if a polarization ratio of the wire grid polarizer 115 is substantially equal to about 99.8% and if a polarization ratio of the lyotropic chromonic liquid crystal polarizer 113 is substantially equal to about 98%, then a polarization ratio of the liquid crystal display panel including the wire grid polarizer 115 and the lyotropic chromonic liquid crystal polarizer 113 may be improved to about 99.998%.

A polarization ratio of the liquid crystal display panel according to the exemplary embodiments of the inventive concept is not limited to the polarization ratios in Table 1.

Figure 4:
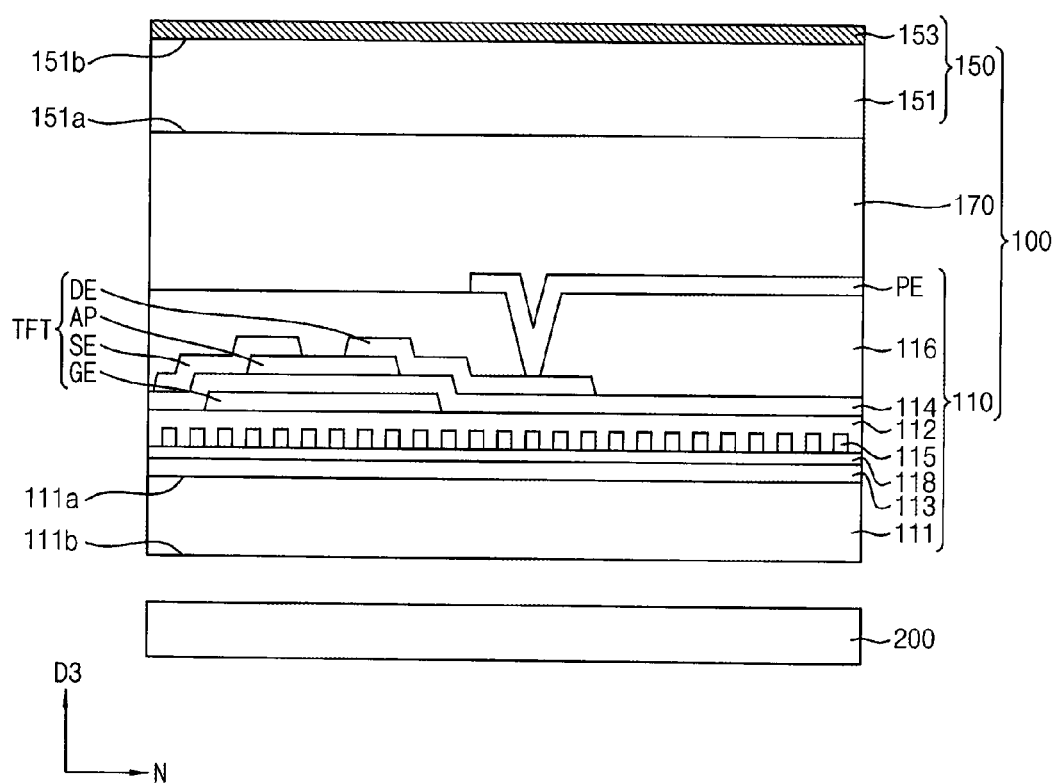
FIG. 4 is a cross-sectional view illustrating a liquid crystal display device according to an exemplary embodiment of the inventive concept.

FIG. 4 is a cross-sectional view illustrating a liquid crystal display device according to an exemplary embodiment of the inventive concept.

Referring to FIG. 4, a liquid crystal display device according to the present exemplary embodiment may include a liquid crystal display panel 100 and a light source part 200. The liquid crystal display panel 100 may include an array substrate 110, an opposing substrate 150 and a liquid crystal layer 170 interposed therebetween. The liquid crystal display device in the present exemplary embodiment is substantially the same as the liquid crystal display device illustrated in FIG. 2 except that a lyotropic chromonic liquid crystal polarizer 113 and a protection layer 118 are disposed between a wire grid polarizer 115 and a first base substrate 111. Hereinafter, the identical elements are briefly described.

The array substrate 110 may include a thin film transistor TFT and a pixel electrode PE. The pixel electrode PE may be electrically connected to the thin film transistor TFT. The opposing substrate 150 may face the array substrate 110. The liquid crystal layer 170 may be disposed between the array substrate 110 and the opposing substrate 150.

The array substrate 110 may further include a first base substrate 111, a lyotropic chromonic liquid crystal polarizer 113, a protection layer 118, a wire grid polarizer 115, a passivation layer 112, a gate insulation layer 114 and an organic insulation layer 116. The thin film transistor TFT may include a gate electrode GE, an active pattern AP, a source electrode SE and a drain electrode DE. An inorganic insulation layer (not shown) may be formed on the source electrode SE and the drain electrode DE, and below the organic insulation layer 116.

The first base substrate 111 may include a first surface 111a and second surface 111b facing the first surface 111a. The first base substrate 111 may include a transparent insulation material. The second surface 111b of the first base substrate 111 may face the light source part 200.

The lyotropic chromonic liquid crystal polarizer 113 may be disposed on the first surface 111a of the first base substrate 111. The lyotropic chromonic liquid crystal polarizer 113 may include a plurality of lyotropic chromonic liquid crystals. The lyotropic chromonic liquid crystals may have a plank shape or a disc shape. The lyotropic chromonic liquid crystals may be stacked as a cylindrical shape to form aggregations. The aggregations may be arranged in a fourth direction N perpendicular to a third direction D3 in which light from the light source part 200 emits. The lyotropic chromonic liquid crystal polarizer 113 may be configured to transmit light parallel with the fourth direction N. The lyotropic chromonic liquid crystal polarizer 113 may be configured to absorb light perpendicular to the fourth direction N.

The protection layer 118 may be disposed on the first base substrate 111 on which the lyotropic chromonic liquid crystal polarizer 113 is disposed. The protection layer 118 may entirely cover the lyotropic chromonic liquid crystal polarizer 113.

The wire grid polarizer 115 may be disposed on the first base substrate 111 on which the protection layer 118 is disposed. The wire grid polarizer 115 may include a plurality of linear metal patterns. The linear metal patterns may be spaced apart from one another by a gap. The linear metal patterns may have a width and a thickness. The width and the thickness of the linear metal patterns may be in a range between tens of nanometers and hundreds of nanometers. The wire grid polarizer 115 may extend in a direction. An incident light substantially perpendicular to the direction in which the wire grid polarizer 115 extends may be transmitted through the wire grid polarizer 115. An incident light substantially parallel with the direction in which the wire grid polarizer 115 extends may be reflected by the wire grid polarizer 115.

In the present exemplary embodiment, the direction in which the wire grid polarizer 115 extends may be substantially perpendicular to the fourth direction N.

The passivation layer 112 may be disposed on the first base substrate 111 on which the wire grid polarizer 115 is disposed. The passivation layer 112 may entirely cover the wire grid polarizer 115. The passivation layer 112 may include a transparent insulation material.

The gate electrode GE may be disposed on the passivation layer 112.

The gate insulation layer 114 may be disposed on the first base substrate 111 on which the gate electrode GE is disposed.

The active pattern AP may be disposed on the gate insulation layer 114. The active pattern AP may overlap the gate electrode GE.

The source electrode SE may be disposed on the gate insulation layer 114. The source electrode SE may overlap a first end portion of the active pattern AP.

The drain electrode DE may be disposed on the gate insulation layer 114. The drain electrode DE may overlap a second end portion of the active pattern AP. The drain electrode DE may be spaced apart from the source electrode SE.

The organic insulation layer 116 may be disposed on the source electrode SE and the drain electrode DE. The organic insulation layer 116 may cover the source electrode SE and the drain electrode DE.

The pixel electrode PE may be disposed on the organic insulation layer 116. The pixel electrode PE may contact the drain electrode DE through a contact hole defined in the organic insulation layer 116.

The opposing substrate 150 may include a second base substrate 151 and an upper polarizer 153. The upper polarizer 153 may be an absorptive polarizer. The upper polarizer 153 may have an absorptive axis perpendicular to that of the lyotropic chromonic liquid crystal polarizer 113 and the wire grid polarizer 115.

The second base substrate 151 may include a third surface 151a and a fourth surface 151b opposite to the third surface 151a. The third surface 151a of the second base substrate 151 may face the array substrate 110.

The upper polarizer 153 may be disposed on the fourth surface 151b of the second base substrate 151. The upper polarizer 153 may include a triacetylcellulose ("TAC") layer, a polyvinyl alcohol ("PVA") layer, or the like.

The light source part 200 may be configured to emit light toward the liquid crystal display panel 100 in the third direction D3.

As mentioned above, the liquid crystal display device according to the present exemplary embodiment may include the wire grid polarizer 115 and the lyotropic chromonic liquid crystal polarizer 113, thereby improving a polarization ratio of backlight from the light source part 200.

Figure 5:
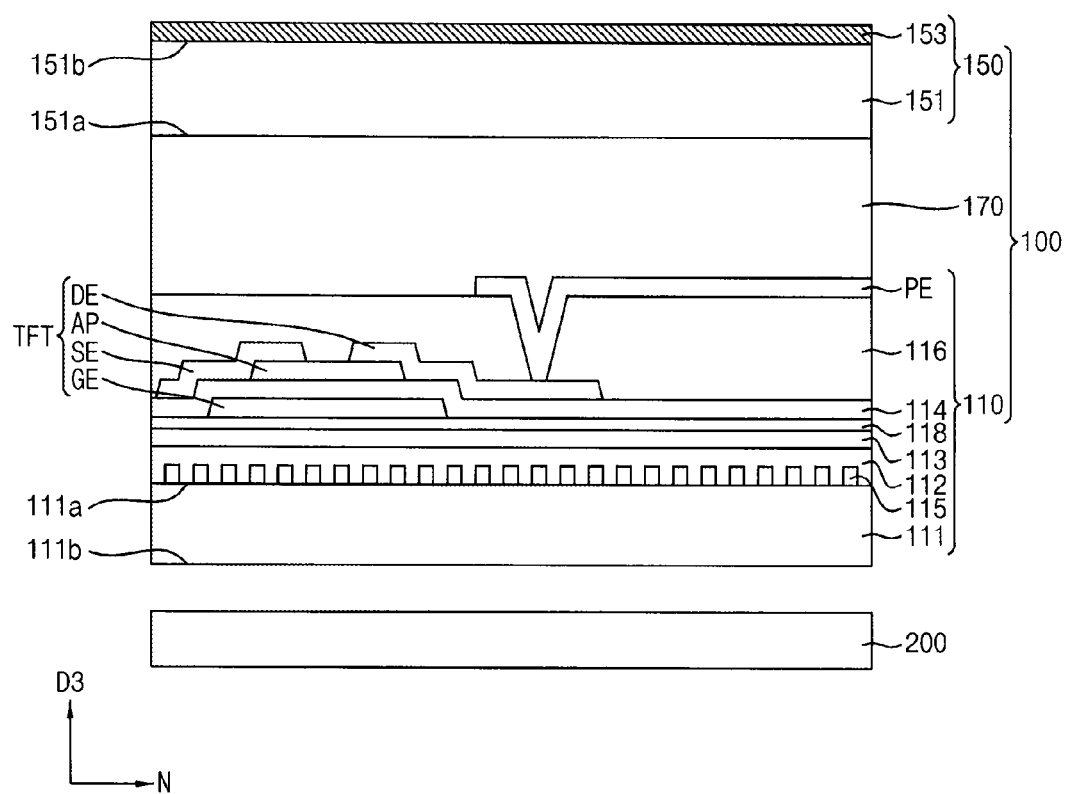
FIG. 5 is a cross-sectional view illustrating a liquid crystal display device according to an exemplary embodiment of the inventive concept.

FIG. 5 is a cross-sectional view illustrating a liquid crystal display device according to an exemplary embodiment of the inventive concept.

Referring to FIG. 5, a liquid crystal display device according to the present exemplary embodiment may include a liquid crystal display panel 100 and a light source part 200. The liquid crystal display panel 100 may include an array substrate 110, an opposing substrate 150 and a liquid crystal layer 170 interposed therebetween. The liquid crystal display device in the present exemplary embodiment is substantially the same as the liquid crystal display device illustrated in FIG. 2 except that a lyotropic chromonic liquid crystal polarizer 113 and a protection layer 118 are disposed on a wire grid polarizer 115. Hereinafter, the identical elements are briefly described.

The array substrate 110 may include a thin film transistor TFT and a pixel electrode PE. The pixel electrode PE may be electrically connected to the thin film transistor TFT. The opposing substrate 150 may face the array substrate 110. The liquid crystal layer 170 may be disposed between the array substrate 110 and the opposing substrate 150.

The array substrate 110 may further include a first base substrate 111, a wire grid polarizer 115, a passivation layer 112, a lyotropic chromonic liquid crystal polarizer 113, a protection layer 118, a gate insulation layer 114 and an organic insulation layer 116. The thin film transistor TFT may include a gate electrode GE, an active pattern AP, a source electrode SE and a drain electrode DE.

The first base substrate 111 may include a first surface 111a and second surface 111b facing the first surface 111a. The second surface 111b of the first base substrate 111 may face the light source part 200.

The wire grid polarizer 115 may be disposed on the first surface 111a of the first base substrate 111. The wire grid polarizer 115 may include a plurality of linear metal patterns. The linear metal patterns may be spaced apart from one another by a gap. The linear metal patterns may have a width and a thickness. The width and the thickness of the linear metal patterns may be in a range between tens of nanometers and hundreds of nanometers. The wire grid polarizer 115 may extend in a direction. An incident light substantially perpendicular to the direction in which the wire grid polarizer 115 extends may be transmitted through the wire grid polarizer 115. An incident light substantially parallel with the direction in which the wire grid polarizer 115 extends may be reflected by the wire grid polarizer 115.

The passivation layer 112 may be disposed on the first base substrate 111 on which the wire grid polarizer 115 is disposed. The passivation layer 112 may entirely cover the wire grid polarizer 115. The passivation layer 112 may include a transparent insulation material.

The lyotropic chromonic liquid crystal polarizer 113 may be disposed on the first base substrate 111 on which the passivation layer 112 is disposed. The lyotropic chromonic liquid crystal polarizer 113 may include a plurality of lyotropic chromonic liquid crystals. The lyotropic chromonic liquid crystals may have a plank shape or a disc shape. The lyotropic chromonic liquid crystals may be stacked as a cylindrical shape to form aggregations. The aggregations may be arranged in a fourth direction N perpendicular to a third direction D3 in which light from the light source part 200 emits. The lyotropic chromonic liquid crystal polarizer 113 may be configured to transmit light parallel with the fourth direction N. The lyotropic chromonic liquid crystal polarizer 113 may be configured to absorb light perpendicular to the fourth direction N.

In the present exemplary embodiment, the direction in which the wire grid polarizer 115 extends may be substantially perpendicular to the fourth direction N.

The protection layer 118 may be disposed on the first base substrate 111 on which the lyotropic chromonic liquid crystal polarizer 113 is disposed. The protection layer 118 may entirely cover the lyotropic chromonic liquid crystal polarizer 113.

The gate electrode GE may be disposed on the protection layer 118.

The gate insulation layer 114 may be disposed on the first base substrate 111 on which the gate electrode GE is disposed.

The active pattern AP may be disposed on the gate insulation layer 114. The active pattern AP may overlap the gate electrode GE.

The source electrode SE may be disposed on the gate insulation layer 114. The source electrode SE may overlap a first end portion of the active pattern AP.

The drain electrode DE may be disposed on the gate insulation layer 114. The drain electrode DE may overlap a second end portion of the active pattern AP. The drain electrode DE may be spaced apart from the source electrode SE.

The organic insulation layer 116 may be disposed on the source electrode SE and the drain electrode DE. The organic insulation layer 116 may cover the source electrode SE and the drain electrode DE. An inorganic insulation layer (not shown) may be formed on the source electrode SE and the drain electrode DE, and below the organic insulation layer 116.

The pixel electrode PE may be disposed on the organic insulation layer 116. The pixel electrode PE may contact the drain electrode DE through a contact hole defined in the organic insulation layer 116.

The opposing substrate 150 may include a second base substrate 151 and an upper polarizer 153. The upper polarizer 153 may be an absorptive polarizer. The upper polarizer 153 may have an absorptive axis perpendicular to that of the lyotropic chromonic liquid crystal polarizer 113 and the wire grid polarizer 115.

The second base substrate 151 may include a third surface 151a and a fourth surface 151b opposite to the third surface 151a. The third surface 151a of the second base substrate 151 may face the array substrate 110.

The upper polarizer 153 may be disposed on the fourth surface 151b of the second base substrate 151. The upper polarizer 153 may include a triacetylcellulose ("TAC") layer, a polyvinyl alcohol ("PVA") layer, or the like.

The light source part 200 may be configured to emit light toward the liquid crystal display panel 100 in the third direction D3.

As mentioned above, the liquid crystal display device according to the present exemplary embodiment may include the wire grid polarizer 115 and the lyotropic chromonic liquid crystal polarizer 113, thereby improving a polarization ratio of backlight from the light source part 200.

Figure 6:
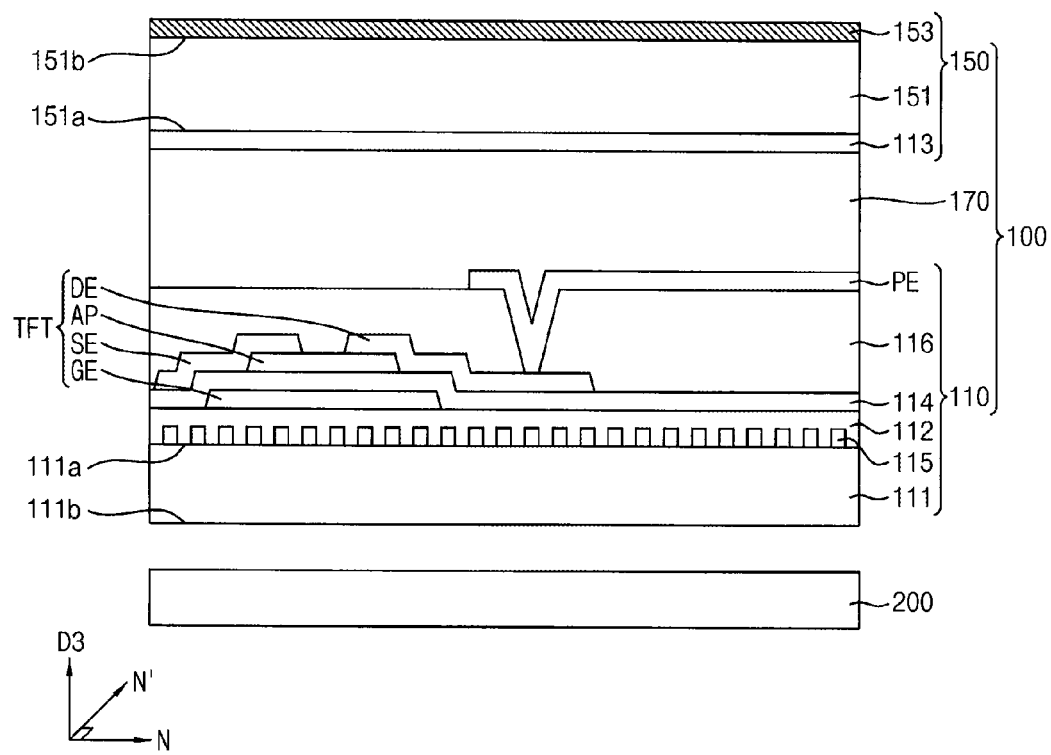
FIG. 6 is a cross-sectional view illustrating a liquid crystal display device according to an exemplary embodiment of the inventive concept.

FIG. 6 is a cross-sectional view illustrating a liquid crystal display device according to an exemplary embodiment of the inventive concept.

Referring to FIG. 6, a liquid crystal display device according to the present exemplary embodiment may include a liquid crystal display panel 100 and a light source part 200. The liquid crystal display panel 100 may include an array substrate 110, an opposing substrate 150 and a liquid crystal layer 170 interposed therebetween. The liquid crystal display device in the present exemplary embodiment is substantially the same as the liquid crystal display device illustrated in FIG. 2 except that the opposing substrate 150 includes a lyotropic chromonic liquid crystal polarizer 113. Hereinafter, the identical elements are briefly described.

The array substrate 110 may include a thin film transistor TFT and a pixel electrode PE. The pixel electrode PE may be electrically connected to the thin film transistor TFT. The opposing substrate 150 may face the array substrate 110. The liquid crystal layer 170 may be disposed between the array substrate 110 and the opposing substrate 150.

The array substrate 110 may further include a first base substrate 111, a wire grid polarizer 115, a passivation layer 112, a gate insulation layer 114 and an organic insulation layer 116. The thin film transistor TFT may include a gate electrode GE, an active pattern AP, a source electrode SE and a drain electrode DE.

The first base substrate 111 may include a first surface 111a and second surface 111b facing the first surface 111a. The second surface 111b of the first base substrate 111 may face the light source part 200.

The wire grid polarizer 115 may be disposed on the first surface 111a of the first base substrate 111. The wire grid polarizer 115 may include a plurality of linear metal patterns. The linear metal patterns may be spaced apart from one another by a gap. The linear metal patterns may have a width and a thickness. The width and the thickness of the linear metal patterns may be in a range between tens of nanometers and hundreds of nanometers. The wire grid polarizer 115 may extend in a direction. An incident light substantially perpendicular to the direction in which the wire grid polarizer 115 extends may be transmitted through the wire grid polarizer 115. An incident light substantially parallel with the direction in which the wire grid polarizer 115 extends may be reflected by the wire grid polarizer 115.

The passivation layer 112 may be disposed on the first base substrate 111 on which the wire grid polarizer 115 is disposed. The passivation layer 112 may entirely cover the wire grid polarizer 115. The passivation layer 112 may include a transparent insulation material.

The gate electrode GE may be disposed on the passivation layer 112.

The gate insulation layer 114 may be disposed on the first base substrate 111 on which the gate electrode GE is disposed.

The active pattern AP may be disposed on the gate insulation layer 114. The active pattern AP may overlap the gate electrode GE.

The source electrode SE may be disposed on the gate insulation layer 114. The source electrode SE may overlap a first end portion of the active pattern AP.

The drain electrode DE may be disposed on the gate insulation layer 114. The drain electrode DE may overlap a second end portion of the active pattern AP. The drain electrode DE may be spaced apart from the source electrode SE.

The organic insulation layer 116 may be disposed on the source electrode SE and the drain electrode DE. The organic insulation layer 116 may cover the source electrode SE and the drain electrode DE. An inorganic insulation layer (not shown) may be formed on the source electrode SE and the drain electrode DE, and below the organic insulation layer 116.

The pixel electrode PE may be disposed on the organic insulation layer 116. The pixel electrode PE may contact the drain electrode DE through a contact hole defined in the organic insulation layer 116.

The opposing substrate 150 may include a second base substrate 151, a lyotropic chromonic liquid crystal polarizer 113 and an upper polarizer 153.

The second base substrate 151 may include a third surface 151a and a fourth surface 151b opposite to the third surface 151a. The third surface 151a of the second base substrate 151 may face the array substrate 110.

The lyotropic chromonic liquid crystal polarizer 113 may be disposed on the third surface 151a of the second base substrate 151. The lyotropic chromonic liquid crystal polarizer 113 may include a plurality of lyotropic chromonic liquid crystals. The lyotropic chromonic liquid crystals may have a plank shape or a disc shape. The lyotropic chromonic liquid crystals may be stacked as a cylindrical shape to form aggregations. The aggregations may be arranged in a fifth direction N' perpendicular to the fourth direction N and a third direction D3 in which light from the light source part 200 emits. The lyotropic chromonic liquid crystal polarizer 113 may be configured to transmit light parallel with the fifth direction N' in which the aggregations are arranged. The lyotropic chromonic liquid crystal polarizer 113 may be configured to absorb light perpendicular to the fifth direction N' in which the aggregations are arranged.

In the present exemplary embodiment, the direction in which the wire grid polarizer 115 extends may be substantially parallel with the fifth direction N' in which the aggregations in the lyotropic chromonic liquid crystal polarizer 113 are arranged.

The upper polarizer 153 may be disposed on the fourth surface 151b of the second base substrate 151. The upper polarizer 153 may include a triacetylcellulose ("TAC") layer, a polyvinyl alcohol ("PVA") layer, or the like. The upper polarizer 153 may be an absorptive polarizer. The upper polarizer 153 may have an absorptive axis parallel with that of the lyotropic chromonic liquid crystal polarizer 113. The upper polarizer 153 may have an absorptive axis perpendicular to that of the wire grid polarizer 115.

The light source part 200 may be configured to emit light toward the liquid crystal display panel 100 in the third direction D3.

As mentioned above, the liquid crystal display device according to the present exemplary embodiment may include the wire grid polarizer 115 and the lyotropic chromonic liquid crystal polarizer 113, thereby improving a polarization ratio of backlight from the light source part 200.

Figure 7:
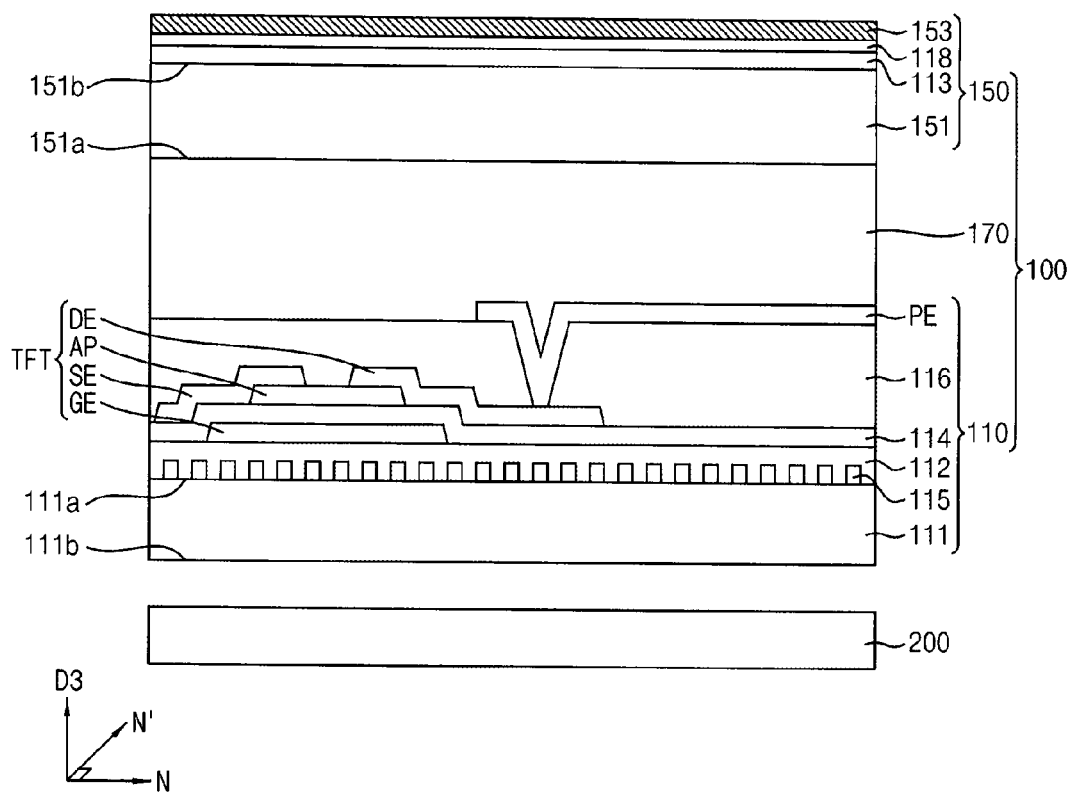
FIG. 7 is a cross-sectional view illustrating a liquid crystal display device according to an exemplary embodiment of the inventive concept.

FIG. 7 is a cross-sectional view illustrating a liquid crystal display device according to an exemplary embodiment of the inventive concept.

Referring to FIG. 7, a liquid crystal display device according to the present exemplary embodiment may include a liquid crystal display panel 100 and a light source part 200. The liquid crystal display panel 100 may include an array substrate 110, an opposing substrate 150 and a liquid crystal layer 170 interposed therebetween. The liquid crystal display device in the present exemplary embodiment is substantially the same as the liquid crystal display device illustrated in FIG. 2 except that the opposing substrate 150 includes a lyotropic chromonic liquid crystal polarizer 113 and a protection layer 118. Hereinafter, the identical elements are briefly described.

The array substrate 110 may include a thin film transistor TFT and a pixel electrode PE. The pixel electrode PE may be electrically connected to the thin film transistor TFT. The opposing substrate 150 may face the array substrate 110. The liquid crystal layer 170 may be disposed between the array substrate 110 and the opposing substrate 150.

The array substrate 110 may further include a first base substrate 111, a wire grid polarizer 115, a passivation layer 112, a gate insulation layer 114 and an organic insulation layer 116. The thin film transistor TFT may include a gate electrode GE, an active pattern AP, a source electrode SE and a drain electrode DE.

The first base substrate 111 may include a first surface 111a and second surface 111b facing the first surface 111a. The second surface 111b of the first base substrate 111 may face the light source part 200.

The wire grid polarizer 115 may be disposed on the first surface 111a of the first base substrate 111. The wire grid polarizer 115 may include a plurality of linear metal patterns. The linear metal patterns may be spaced apart from one another by a gap. The linear metal patterns may have a width and a thickness. The width and the thickness of the linear metal patterns may be in a range between tens of nanometers and hundreds of nanometers. The wire grid polarizer 115 may extend in a direction. An incident light substantially perpendicular to the direction in which the wire grid polarizer 115 extends may be transmitted through the wire grid polarizer 115. An incident light substantially parallel with the direction in which the wire grid polarizer 115 extends may be reflected by the wire grid polarizer 115.

The passivation layer 112 may be disposed on the first base substrate 111 on which the wire grid polarizer 115 is disposed. The passivation layer 112 may entirely cover the wire grid polarizer 115. The passivation layer 112 may include a transparent insulation material.

The gate electrode GE may be disposed on the passivation layer 112.

The gate insulation layer 114 may be disposed on the first base substrate 111 on which the gate electrode GE is disposed.

The active pattern AP may be disposed on the gate insulation layer 114. The active pattern AP may overlap the gate electrode GE.

The source electrode SE may be disposed on the gate insulation layer 114. The source electrode SE may overlap a first end portion of the active pattern AP.

The drain electrode DE may be disposed on the gate insulation layer 114. The drain electrode DE may overlap a second end portion of the active pattern AP. The drain electrode DE may be spaced apart from the source electrode SE.

The organic insulation layer 116 may be disposed on the source electrode SE and the drain electrode DE. The organic insulation layer 116 may cover the source electrode SE and the drain electrode DE. An inorganic insulation layer (not shown) may be formed on the source electrode SE and the drain electrode DE, and below the organic insulation layer 116.

The pixel electrode PE may be disposed on the organic insulation layer 116. The pixel electrode PE may contact the drain electrode DE through a contact hole defined in the organic insulation layer 116.

The opposing substrate 150 may include a second base substrate 151, a lyotropic chromonic liquid crystal polarizer 113, a protection layer 118 and an upper polarizer 153. The upper polarizer 153 may be an absorptive polarizer. The upper polarizer 153 may have an absorptive axis parallel with that of the lyotropic chromonic liquid crystal polarizer 113. The upper polarizer 153 may have an absorptive axis perpendicular to that of the wire grid polarizer 115.

The second base substrate 151 may include a third surface 151a and a fourth surface 151b opposite to the third surface 151a. The third surface 151a of the second base substrate 151 may face the array substrate 110.

The lyotropic chromonic liquid crystal polarizer 113 may be disposed on the fourth surface 151b of the second base substrate 151. The lyotropic chromonic liquid crystal polarizer 113 may include a plurality of lyotropic chromonic liquid crystals. The lyotropic chromonic liquid crystals may have a plank shape or a disc shape. The lyotropic chromonic liquid crystals may be stacked as a cylindrical shape to form aggregations. The aggregations may be arranged in a fifth direction N' perpendicular to a third direction D3 in which light from the light source part 200 emits. The lyotropic chromonic liquid crystal polarizer 113 may be configured to transmit light parallel with the fifth direction N' in which the aggregations are arranged. The lyotropic chromonic liquid crystal polarizer 113 may be configured to absorb light perpendicular to the fifth direction N' in which the aggregations are arranged.

In the present exemplary embodiment, the direction in which the wire grid polarizer 115 extends may be substantially parallel with the fifth direction N' in which the aggregations in the lyotropic chromonic liquid crystal polarizer 113 are arranged.

The protection layer 118 may be disposed on the second base substrate 151 on which the lyotropic chromonic liquid crystal polarizer 113 is disposed. The protection layer 118 may entirely cover the lyotropic chromonic liquid crystal polarizer 113.

The upper polarizer 153 may be disposed on the protection layer 118. The upper polarizer 153 may include a triacetylcellulose ("TAC") layer, a polyvinyl alcohol ("PVA") layer, or the like.

The light source part 200 may be configured to emit light toward the liquid crystal display panel 100 in the third direction D3.

As mentioned above, the liquid crystal display device according to the present exemplary embodiment may include the wire grid polarizer 115 and the lyotropic chromonic liquid crystal polarizer 113, thereby improving a polarization ratio of backlight from the light source part 200.

As mentioned above, according to one or more exemplary embodiment of the liquid crystal display device, a liquid crystal display panel may have a patterned vertical alignment structure in which a pixel area is divided into two domains and a light diffusion film on the liquid crystal display panel may include a plurality of low-refractive line members substantially perpendicular to an alignment direction of liquid crystals in the liquid crystal display panel in a plan view, thereby improving a viewing angle in all directions including a longitudinal direction and a transverse direction.

The foregoing is illustrative of exemplary embodiments and is not to be construed as limiting thereof. Although a few exemplary embodiments have been described, those skilled in the art will readily appreciate that many modifications are possible in exemplary embodiments without materially departing from the novel teachings and advantages of the present inventive concept. Accordingly, all such modifications are intended to be included within the scope of exemplary embodiments as defined in the claims. In the claims, means-plus-function clauses are intended to cover the structures described herein as performing the recited function and not only structural equivalents but also equivalent structures. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A liquid crystal display panel comprising:
a first base substrate;
a wire grid polarizer disposed on the first base substrate and comprising a plurality of linear metal patterns extending in a first direction;
a lyotropic chromonic liquid crystal polarizer disposed on the first base substrate, the lyotropic chromonic liquid crystal polarizer comprising aggregations of a plurality of lyotropic chromonic liquid crystals, the aggregations being arranged in a second direction substantially perpendicular to the first direction;
a second base substrate facing the first base substrate; and
a liquid crystal layer disposed between the first base substrate and the second base substrate.

2. The liquid crystal display panel of claim 1, wherein the wire grid polarizer and the lyotropic chromonic liquid crystal polarizer are disposed on the first base substrate.

3. The liquid crystal display panel of claim 2, wherein the wire grid polarizer and the lyotropic chromonic liquid crystal polarizer have a same transmission axis.

4. The liquid crystal display panel of claim 3, wherein the lyotropic chromonic liquid crystal polarizer is disposed on a first surface of the first base substrate, and the wire grid polarizer is disposed on a second surface of the first base substrate opposite to the first surface of the first base substrate.

5. The liquid crystal display panel of claim 3, wherein the lyotropic chromonic liquid crystal polarizer and the wire grid polarizer are disposed on a same surface of the first base substrate.

6. The liquid crystal display panel of claim 5, wherein the wire grid polarizer is disposed between the lyotropic chromonic liquid crystal polarizer and the first base substrate.

7. The liquid crystal display panel of claim 5, wherein the lyotropic chromonic liquid crystal polarizer is disposed between the wire grid polarizer and the first base substrate.

8. The liquid crystal display panel of claim 7, further comprising a protection layer disposed between the wire grid polarizer and the lyotropic chromonic liquid crystal polarizer.

9. The liquid crystal display panel of claim 8, further comprising an absorptive polarizer disposed on the second base substrate.

10. A liquid crystal display panel comprising:
an array substrate comprising a wire grid polarizer and a thin film transistor disposed on the wire grid polarizer, the wire grid polarizer comprising a plurality of linear metal patterns extending in a first direction;
an opposing substrate facing the array substrate; and
a liquid crystal layer disposed between the array substrate and the opposing substrate,
wherein the opposing substrate comprises:
a base substrate; and
a lyotropic chromonic liquid crystal polarizer on the base substrate, the lyotropic chromonic liquid crystal polarizer comprising aggregations of a plurality of lyotropic chromonic liquid crystals, the aggregations being arranged in a second direction substantially perpendicular to the first direction.

11. The liquid crystal display panel of claim 10, wherein the lyotropic chromonic liquid crystal polarizer is disposed on a first side of the base substrate, the first side facing the liquid crystal layer.

12. The liquid crystal display panel of claim 10, wherein the opposing substrate further comprises an absorptive polarizer disposed on a second side of the base substrate, the second side being opposite to the first side.

13. The liquid crystal display panel of claim 10, wherein the opposing substrate further comprises an absorptive polarizer disposed on a first side of the base substrate,
wherein the lyotropic chromonic liquid crystal polarizer is disposed between the base substrate and the absorptive polarizer.

14. The liquid crystal display panel of claim 13, further comprising a protection layer disposed between the lyotropic chromonic liquid crystal polarizer and the absorptive polarizer.

15. A liquid crystal display device comprising:
an array substrate comprising a base substrate, a plurality of polarizers disposed on the base substrate, a thin film transistor disposed on the polarizers and a pixel electrode electrically connected to the thin film transistor, an opposing substrate facing the array substrate;

a liquid crystal layer disposed between the array substrate and the opposing substrate; and a light source part configured to emit light toward the array substrate, wherein the polarizers comprise:

a wire grid polarizer comprising a plurality of linear metal patterns extending in a first direction; and a lyotropic chromonic liquid crystal polarizer comprising aggregations of a plurality of lyotropic chromonic liquid crystals, the aggregations being arranged in a second direction substantially perpendicular to the first direction.

16. The liquid crystal display device of claim 15, wherein the wire grid polarizer is disposed between the lyotropic chromonic liquid crystal polarizer and the base substrate.

* * * * *